May 30, 1944.  P. GARDNER  2,350,027
METHOD OF MAKING BIAS FABRIC
Filed March 17, 1942  4 Sheets-Sheet 1
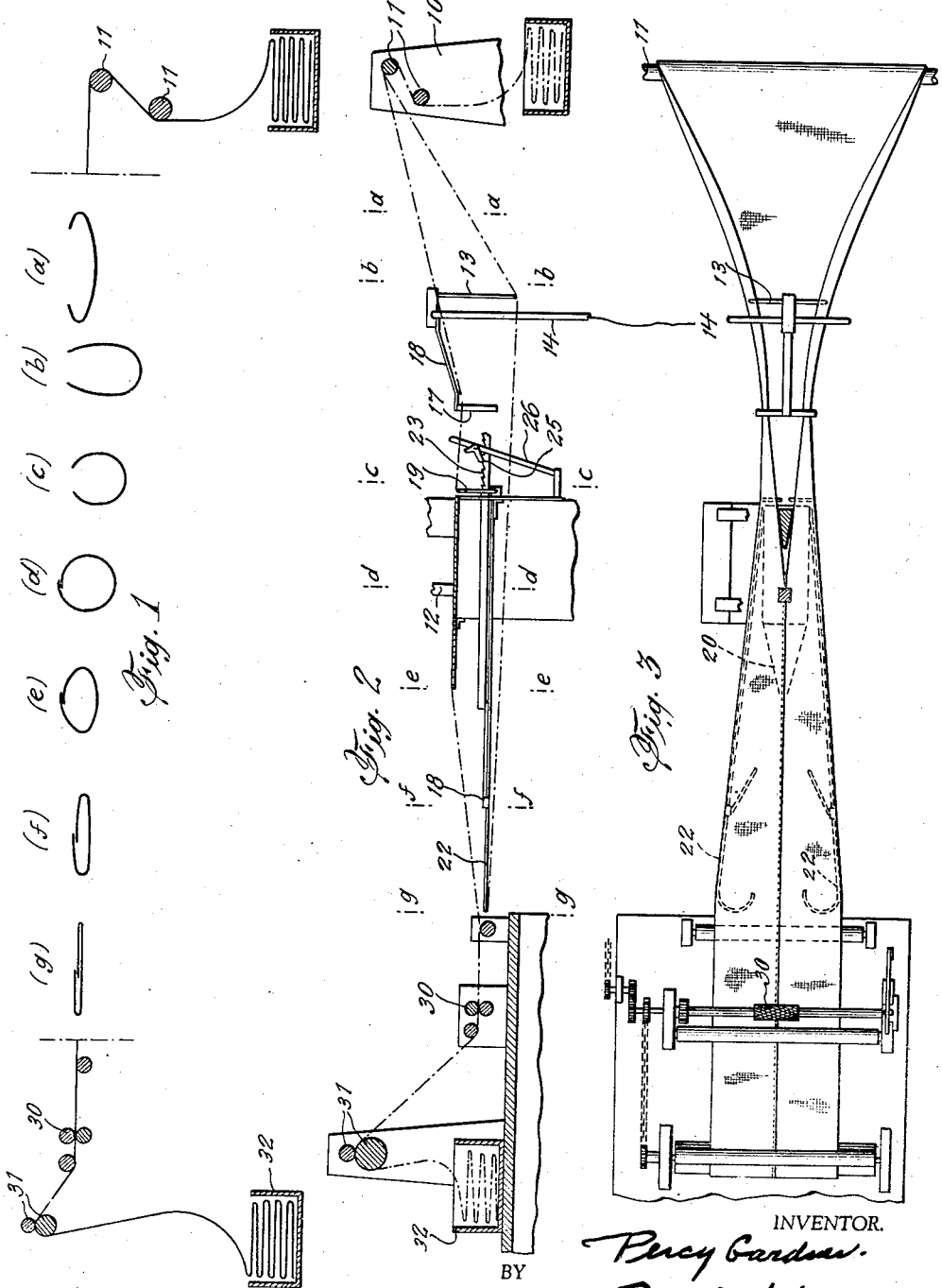
INVENTOR.
Percy Gardner.
BY Robert J. Hulsizer
atty.

May 30, 1944.   P. GARDNER   2,350,027
METHOD OF MAKING BIAS FABRIC
Filed March 17, 1942   4 Sheets-Sheet 2
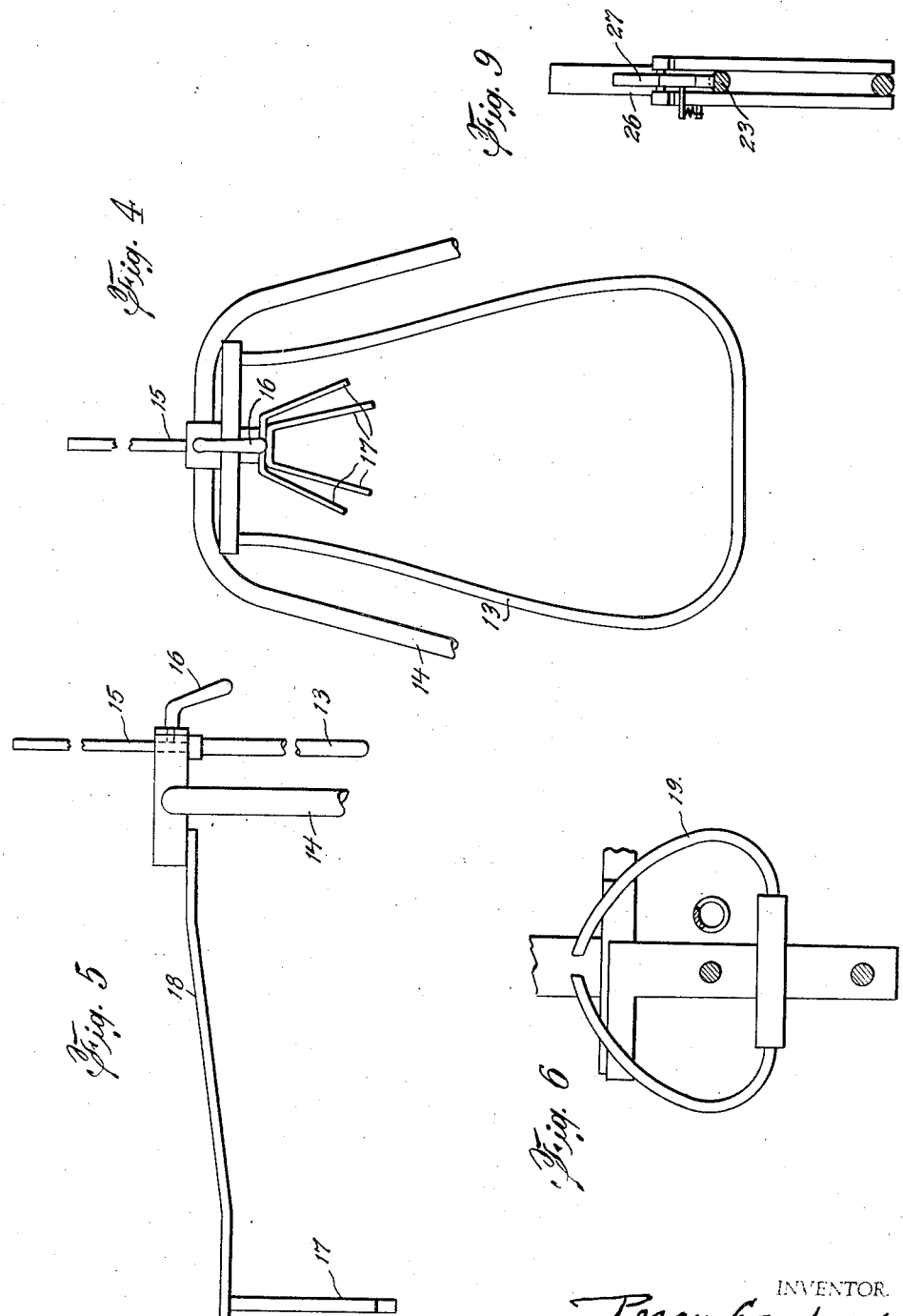
INVENTOR.
Percy Gardner.
BY Robert J. Halsey May 30, 1944.　　　P. GARDNER　　　2,350,027
METHOD OF MAKING BIAS FABRIC
Filed March 17, 1942　　　4 Sheets-Sheet 3
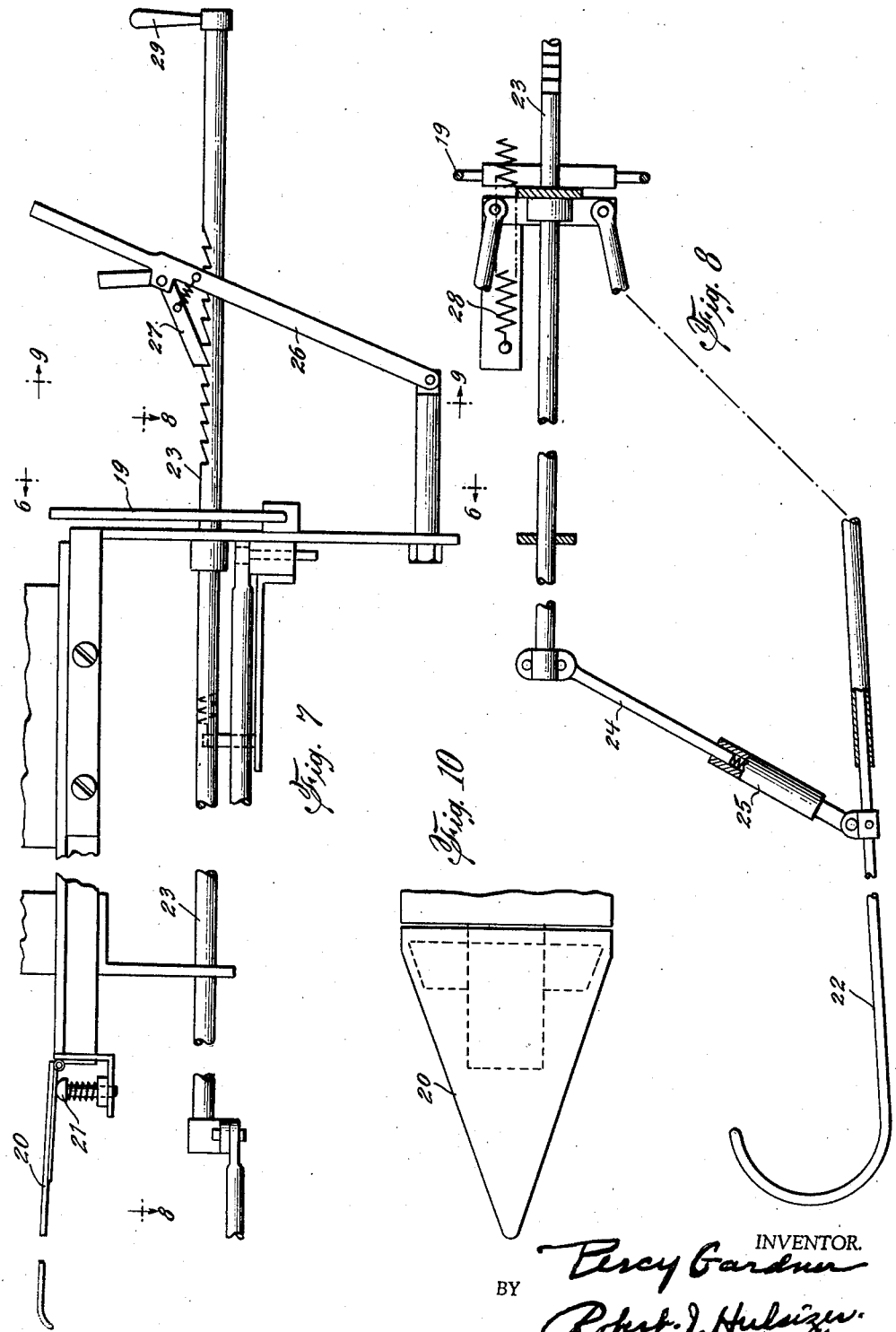

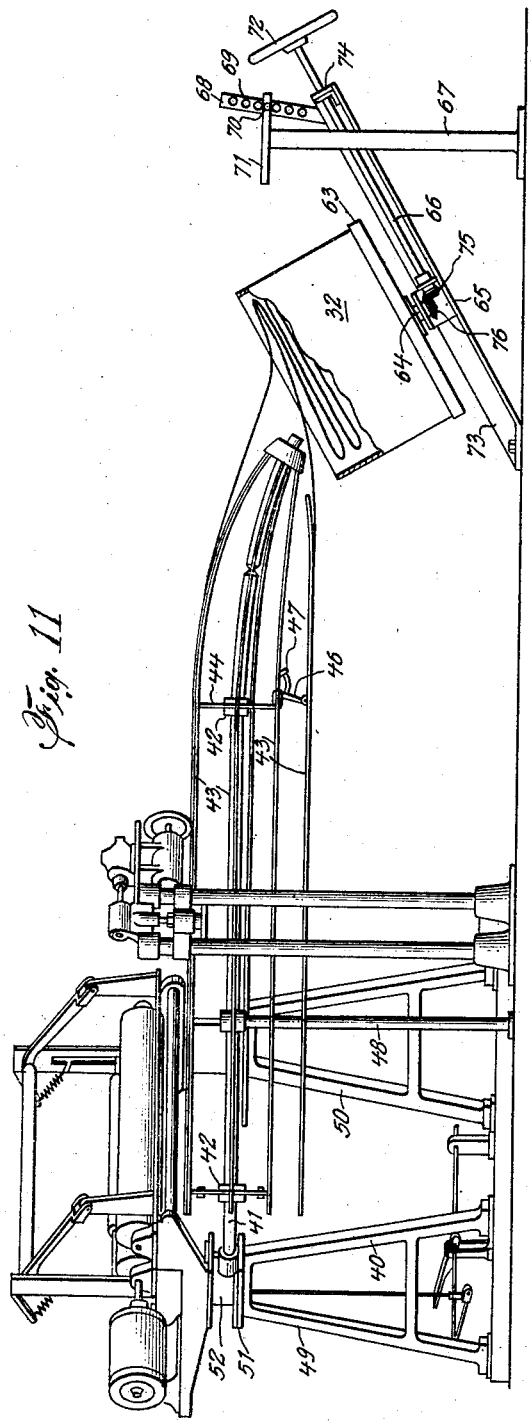
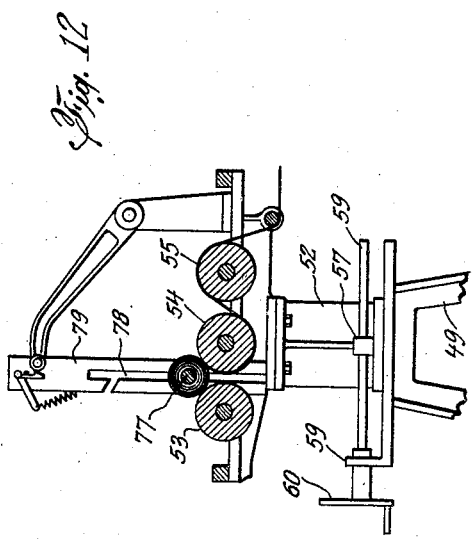

Patented May 30, 1944

2,350,027

UNITED STATES PATENT OFFICE 2,350,027

METHOD OF MAKING BIAS FABRIC

Percy Gardner, Glen Ridge, N. J., assignor to Lever Bias Machine Corporation, New York, N. Y., a corporation of New York Application March 17, 1942, Serial No. 435,021

8 Claims. (Cl. 28—72)

This invention relates to the manufacture of bias-cut binding material and chiefly concerns a new and useful method of making the same.

An object of the invention is to present a method by which the material can be made with a minimum of handling from the time it is received as unfinished material until it is wound up as a finished product.

A further object is to provide a method whereby the maximum of finished material may be produced in a minimum of time with the least expenditure of effort and time on the part of the operator.

A still further object is to provide a method whereby the material is so handled as to be kept under complete regulated tension at all times whereby the finished product is produced with a minimum of wastage in the cutting off of uneven edges.

Further and more specific objects, features, and advantages will more clearly appear when considered in connection with the following detailed specification, and particularly when studied in connection with accompanying drawings which form part of the specification and which illustrate one form of apparatus which has been developed to physically embody the herein novel method.

Considering the invention briefly but in a broad and general manner, it is to be noted that sheet material manufactured to be formed into bias-cut material generally comes from the manufacturer in the form of rolls, or in cartons in which it is disposed in rather loosely folded condition.

The material is transferred first in a continuous manner from the roll or carton and subjected to a series of treatments at the end of which it is in the form of a flat tube which is allowed to drop naturally into another carton or container in which it collects in a loose folded condition.

In this first series of treatments, the material is moved through the various treatment-zones or positions by being pulled therethrough in a constant regulated manner. As it so moves it is first subjected to a certain amount of guiding regulatory tension, after which it is subjected to a series of forming operations which transforms it gradually and smoothly from a flat sheet to the approximate form of the desired tube of material just as it reaches a position where the adjacent free edges are suitably fastened together to form a complete tube by any suitable fastening device. Since these forming steps are used to form sheet goods of different widths, it is essential that one of the elements used to form the goods into a tubular configuration be adjustable so as to enable it to be raised or lowered to govern and define the bottom of the tube which naturally will vary somewhat as the material being worked on is of greater or less width. This is especially true since the top line of the goods after it reaches approximately tubular shape is maintained substantially horizontal.

As the material thus shaped into tubular form from the flat sheet condition reaches the fastening position, it is fastened together at its free edges either by a sewing device or other fastening means but in any event the device which fastens the edges together has nothing to do with the movement of the material past this point. If a sewing device is employed it has no feed dogs to feed the material since all the movement of the material past the fastening point or position and through the whole machine is by reason of the pull-away device at the end of the machine.

In passing from the fastening position to the pull away of the feeding device the material, as it leaves the fastening position, is naturally in a substantially tubular form but must be transformed to a flat sheet condition to enable it to be passed through and between guiding and pulling means which will flatten it out and allow it to be dropped into a carton or container in loosely folded flat folds. To effect this result between the fastening position and the pull-away position, the material is subject to a spreading action which tends to present it to the pull-away position in a substantially flat form.

In order to most effectively advance the material from the roll or carton in the condition in which it will be least likely to distortion and will most smoothly advance through the machine with the least guiding effort on the part of the operator, it is necessary and desirable that the level of the pull-away device be designated to be approximately disposed about at the level of the center of the tube as it passes the fastening position.

After the material has passed the pull-away position it passes over guiding devices which allow it to drop naturally by gravity into a container or carton in loosely disposed natural folds.

After a given length of sheet material has thus been formed into tubular material and allowed to drop into a container, this container is removed and placed on or in a position on a platform which is rotatable and adjacent the end of a bias cutting machine.

In passing through this device the material is advanced spirally and cut on the bias under constant regulated tension and the entire progress through the machine is due to the pull-away device at the end of the machine which pulls the material through and over the machine. The method involves advancing the material over a support or mandrel in a spiral manner and subjecting it to regulated automatic tension while thus being advanced. It is then cut and pulled away in bias-cut sheets onto a wind-up device which also forms the only means in the machine for pulling or advancing the material through the device. In the wind-up of the material it is largely the weight of the material which is responsible for the tension created therein which causes it to be pulled through the machine. As the material is thus advanced and pulled through the machine which cuts it on the bias, it is wound up on a roll. When the roll is completely wound up, it is taken off the machine and then is ready to be cut into disks of the desired width ready for the trade.

The method above generally and broadly set forth has been incorporated in a specific apparatus shown in the accompanying drawings, but it is to be understood that this particular form shown is only one form of apparatus which may be used to embody the principles of the method set forth.

In the drawings which embody one preferred form of apparatus by which the method may be practised—

Fig. 1 is a schematic diagrammatic view showing the various steps of treatment to which the material is subjected in forming it into a complete tube;

Fig. 2 is a side elevation of the apparatus for forming the tubular material;

Fig. 3 is a plan of the apparatus;

Fig. 4 is a section through the apparatus showing one of the forming devices which determines the bottom of the formed tube;

Fig. 5 is a side view of another and subsequent forming device;

Fig. 6 is a front elevation of the device shown in Fig. 5;

Fig. 7 is an enlarged partial side view of the means for spreading the tube after it has been formed;

Fig. 8 is a partial plan of the same device;

Fig. 9 is a partial cross section through Fig. 7;

Fig. 10 is a partial plane view of the device for tensioning the material after it has been formed;

Fig. 11 is a general side view of the device to take the tubular material and cut it on the bias and wind it up into a roll;

Fig. 12 is a cross section taken through the wind-up device; and

Fig. 13 is a partial plan view of the wind-up device.

As shown in the drawings, the invention comprises a combination of elements or devices which are adapted and related to engage and act on the goods in order to transform it from a flat sheet to a joined tube, and then to flatten it out again after it has been made into a tube in order to roll it up or allow it to drop into a suitable container in loosely disposed folds. Any suitable support may be provided for the sheet material, and in the drawings there is shown a support member 10 having rolls 11 over which the material may pass in a guided regulated manner from the container disposed on the floor and in which the material is received from the manufacturer in loosely folded condition. Or the material may be thus received in roll form, in which case it is mounted on the support 10 in any suitable manner beneath the rolls 11.

The material is advanced to a joining device, indicated generally by the numeral 12. This joining device may be a sewing machine or a machine adapted to join the edges of the material adhesively or by means of adhesive tape, or any other suitable means for joining the edges together.

In order most effectively to present the material to the joining device and require as little effort as possible of the operator to introduce the adjacent edges to the joining device, there are disposed between the joining device and the support 10 a plurality of material forming means which will accurately guide and control the material from a flat sheet form to a tubular form. The first of these devices is indicated by the numeral 13 and comprises a substantially U-shaped curved frame which is dependent from a standard 14 connected to the floor and is vertically adjustable, as shown in Figs. 4 and 5, by means of a sliding rod 15 and an adjusting handle 16, so that this curved guide frame can be moved vertically. As shown in Figs. 2 and 3, the material passes around the bottom and sides of this guide frame and by reason of its vertical adjustment the level of the portion of the tube opposite the joining line is definitely determined.

As shown in Figs. 4 and 5, spaced angularly disposed upper-edge forming devices 17 are supported from the standard 14 by means of a bar 18 in advance of the forming member 13, and these elements are disposed nearer the joining device to more closely confine and draw the upper edges of the tubular material together. Still closer to the joining device is a curved ring-like guiding member 19, as shown in Fig. 6. This is mounted on any suitable portion of the frame of the joining device and is the last forming unit engaging the material before it passes through the joining position.

As shown in Figs. 2 and 3, it will be obvious that these various elements which progressively engage the material will gradually and evenly transform it from a flat sheet form to a substantially tubular form so that the operator can very easily manipulate the edges to the joining means and keep the material running smoothly and evenly therethrough.

After the material passes through the joining device the joined seam portion is placed under regulated tension by means of the pressure plate 20 shown in Figs. 3, 7 and 10. This pressure plate 20 is pivoted to the frame of the joining device and pressed upwardly by a spring-engaged stud 21, so that it exerts an upward pressure along the seam and is preferably triangular in shape so that the narrow point of it will more effectively exert this pressure on the seam itself.

Still further beyond the joining device it is necessary to re-shape the tubular material into a flat form again in order that it may pass to and through a pull-away device in a flat form to be rolled up. To this end there is provided a pair of stretching means, such as 22, forming curved arms which are pivoted to a frame of the joining device and which can be swung toward and away from each other to regulate their pressure against the material. In order to regulate the pressure of these stretching arms on the ends, I provide a slidable rack bar 23, shown in Fig. 7. This bar is suitably journalled on the frame of the machine and at its forward end is connected to a pair of arms 24, each of which is provided with a telescopic slidable joint, indicated by the numeral 25, which connects it with the respective arms 22. The rack bar 23 can be adjusted in any desired position to regulate the tension of the arms 22 by means of a pivoted arm 26 having a pawl 27 to engage the teeth of the rack. This arm 26 is urged in one direction, as indicated in Fig. 8, by means of a spring 28. A handle 29 on the end of the rack bar 23 enables it to be moved back and forth to adjust the tension on the stretching arms 22. This provides a simple means whereby the material can be stretched in a regulated manner to flatten it out after it has been joined, but the provision of telescopic joints in each of the arms 24 will enable each of these arms to automatically adjust themselves as the character of the material in the tube may vary as to its tension and diameter. This independence of adjustment will enable the tube to run more smoothly and evenly through the machine at high speed.

In order to pull the material through the machine, there is provided a pull-away device comprising a series of rollers which are power-driven and preferably connected to operate in synchronism with the drive of the joining device. These pull-away rollers, indicated by the numeral 30, are mounted on suitable shafting and at least two of them, as shown in Fig. 2, are superposed and receive the material between them. These rollers on the upper side of the material are preferably knurled and have a considerably greater diameter near the center of the tube than along the rest of their length, so that the main contact on the material of this upper roller is along the center of the tube adjacent each side of the seam. In effect, this construction and central pull-away device tends to pull the material through the machine more smoothly and evenly and keeps the seam running in the regular center line of the device requiring little, if any, effort on the part of the operator to guide the seam. This central pulling effect, in conjunction with the closely adjacent stretching arms, flattens the tube out and enables the material to be rolled up very smoothly.

It will be observed from Fig. 2 that the level of the joining device where the material is joined, is higher than the level of the material as it passes through the pull-away rollers, and that the level of the pull-away rollers is about intermediate the level of the joining device and the bottom of the first forming frame 13. It has been found after many trials that having the pull on the material exerted along an intermediate level creates a more efficient tension in the tube and in the material as it passes through the machine, and consequently results in a more even movement. After the material passes between the rollers 30 it extends upwardly between friction rollers 31 and then is allowed to drop by gravity into a carton 32 in which it collects in a loosely folded condition readily adaptable to be pulled thereout in the next step of the method, as will be hereinafter set forth.

The details of the particular apparatus set forth above is clearly shown described and claimed in a co-pending application in the name of Gardner and Kagan, Serial No. 384,224 filed March 19, 1941, and entitled "Apparatus for forming tubular material."

It will be apparent, therefore, that this relatively simple apparatus forms a combination of operative elements which enable the material to flow smoothly and evenly at a rapid speed through the device to be transformed from sheet material into joined tubular material and then flattened out and rolled up and stored away in a continuous operation under the control of one operator of whom is required very little effort or skill. In Fig. 1 of the drawings the schematic view shows in rather clear manner the various steps of treatment to which the material is subjected in its continuous flow from one container to the other.

After a given length of material is thus collected in the end container 32, this container is then removed with the material therein and placed in association with another machine in which it is again treated to a series of operations which result in it being rolled up in a smooth even-edged roll of bias-cut material ready to be sliced up into the well-known disks of bias-cut material for use in the trade. This next machine is one, the details of which are clearly shown in a U. S. Patent No. 2,110,856 issued March 15, 1938, to Percy Gardner et al., and entitled "Bias cutting and wind-up apparatus."

This particular machine which forms the physical embodiment of the last portion or step in the general method, is shown in Figs. 11, 12 and 13 herein.

In these drawings the present preferred form which the invention may assume comprises a pedestal 40 from which a shaft 41 extends horizontally. This shaft supports a plurality of spider plates 42 on the periphery of which a plurality of longitudinally extending bars 43 are mounted to form the outline of a mandrel over which the material is to be fed. Some of these bars are more or less permanently adjustable to desired positions by means of being supported on arms 44 which slide in the spider frame 42 and are adjusted by means suitable for that purpose. One of these mandrel arms 44, preferably the lowest one, is supported from arms 44 by means of a pivot arm 46 counterbalanced by a gravity-operated counterweight 47 which tends to keep the bar in its lowermost or outermost position at all times. This will cause a steady even pressure on the material which is spirally passing over the mandrel and therefore will exert a constant tension on it and therefore tend to keep it passing over the mandrel in a perfectly even state of tension and of practically constant diameter. At a point where the goods leave the mandrel to pass to the wind-up device, the shaft 41 may be supported by an auxiliary pedestal 48.

The wind-up device is mounted on pedestals 49 and 50 which support the bed plate 51 thereon. On this bed plate is supported rollers 53 and 54 and 55 which form essential parts of the wind-up device. The frame 52 supporting the rollers and the wind-up apparatus is pivoted at 56 to the bed plate 51 and at the other end is provided with an apertured threaded lug 57 through which passes a screw 58 journalled loosely in a slotted flange 59 fastened to the bed plate 51. The loose engagement of the screw 58 in the slotted flange 59 permits slight necessary angular changes in the position of the screw shaft 58 as the frame 52 swing. The handle 60 permits the screw to be rotated and thus to swing the end of the frame 52 in either direction whereby its angle with respect to the axis of the mandrel can be quickly and easily adjusted and, if desired, even while the machine is running. In most cases, however, it is desired before the cutting starts, to cut and wind a given length of material at a specified width, and the frame 52 is set at the position to give that width before the cutting and winding operation begins. A scale (not shown) may be applied to be calibrated in terms of material widths for the different positions of the frame 52.

In Fig. 11 is shown a rotatable platform, such as 63, adapted to receive the container 32 previously mentioned, in which is loosely disposed the material in loose folds as it has been received therein as it drops from the sewing machine making it into tubular form. The platform 63 is supported on a shaft 64 journalled on plate 65 also journalling a shaft 66. The plate 65 is fastened to a beam 73 fastened loosely at one end to the floor and at the other end to a pedestal or upright member 67 by means of an adjustable apertured link 69, one end of which is fastened to the beam 73 and the other end of which through the holes 68 is connected adjustably to a pin 70 on the top of the pedestal 67, as at plate 71. A hand wheel 72 is connected to the outer end of the shaft 66 and turns the same. The outer end of the shaft 66 is journalled in the flange plate 74. The opposite end of the shaft 66 has a bevel gear 75 thereon meshing with a bevel gear 76 on the stub shaft 64.

In the general operation of this second machine which embodies the latter portion or step of the method, we will assume that an order has been received to cut on the bias a given length of goods of a definite width. The frame 52 is then set for that width of cut. The material in tubular form has been sewed or fastened in that form by the apparatus above set forth and in accordance with the first portion of this method, and has dropped loosely into the container 32. This container is then mounted on the platform 63 and enough material is pulled out to extend over the mandrel and to and between the wind-up rollers 53, 54 and 55 and around the core 77 which rises and falls in slots 78 in side frame members 79 as the material is wound up thereon. Then the motor is started and the wind-up device pulls the material across and over the mandrel where it is cut by the usual knife and is wound up at the given width. All this time the operator stands at the hand wheel 72 and turns it slowly in synchronism with the movement of the material spirally across the mandrel. The material being loosely folded and disposed in the box 32 will be drawn out with an absolute minimum of resistance due to the inclination of the upper face of the box so that the pulling of the goods through the machine occurs with a minimum disturbance to the tension maintained in the goods by the pull-off device and by the automatically expansible mandrel.

Thus, generally speaking, the apparatus set forth and shown in Figs. 11, 12 and 13 involves a mandrel provided with automatically gravity-operated means to maintain in the goods a constant tension as it passes over the mandrel. It also involves a freely rotatable support for the material of such disposition that the material can be withdrawn therefrom with a minimum of resistance and disturbance of the even tension with which the material passes through the machine. It furthermore involves a wind-up device which is a pull-away means constituting the only means for advancing the material through the machine, and in which the weight of the goods as it winds up constitutes a substantial portion of the means to create the pull in the goods to advance it through the machine, and wind it up with such evenness and uniformity as will cause the lateral edges of the roll of wound-up material to be substantially smooth and even to avoid wastage usually occurring and which requires cutting off substantial portions of such rolls under ordinary operations. Further details of the wind-up device and its operation may be seen in U. S. Patent No. 1,955,282 issued April 17, 1934, and entitled "Bias cutting and wind-up apparatus."

Thus it will be seen that the entire method involves two main groups of operations as follows:

(1) Forming the material into a tubular form;
(2) Cutting the tubular material on the bias and winding it up evenly and smoothly.

In the first group of operations or treatments to which the material is subject, namely, in the formation of the tube, it is pulled through this stage evenly and smoothly from one end of the device with the pull always being exerted at a level substantially even with the center of the tube being formed. As it is drawn out of the container in which it is received, or off the roll as it comes from the manufacturer, it is gradually and smoothly formed into an approximation of the tubular shape so that as it reaches the fastening position, such as the sewing point, it is of practically the full tubular shape it is desired for it to have. While passing the fastening point the material is not subjected to any feeding action due to the fastening or sewing device but gets its entire motion through the machine from the pull-away effort.

After it has been formed it is then placed under tension along the seam and stretched gradually out into a flat shape so that when it reaches the pull-away position and passes through that position it is pressed out flat and allowed to drop loosely into a suitable container where it is ready for the next operation of being cut on the bias and wound up in bias-cut rolls.

In the second group of operations or treatments to which the material is subjected in this method, it is also pulled through the bias cutting device by a pull-away device at one end of the machine, and this constitutes the only means for feeding the material through the machine. It is also freely and with minimum resistance fed out of the container on to a mandrel over which it travels in a spiral path under automatic and constant even tension. As it passes over the mandrel it is cut and then passes to the wind-up position where the weight of the material itself creates substantially all the tension in the goods needed to pull it through the machine.

While the present preferred form of the invention has been shown and described in detail, it is of course understood that as to the method herein, the form of apparatus employed is only illustrative of one form which may be used to embody the same method, and the invention is not therefore to be limited to this apparatus or the present form shown and described for purposes of illustration. This invention is not to be limited to the details and forms shown since many changes and modifications may be made in the invention without departing from the spirit and scope of the invention in its broadest aspects. Hence it is desired to cover any and all forms and modifications of the invention which may come within the language or scope of any one or more of the appended claims.

I claim:

1. A method of making bias fabric which comprises the step of pulling sheet material out of a container and through a series of treatment-zones or positions, during which the material is formed into approximately tubular form, fastened at its adjacent edges to form a tube, subjected along the finished seam to regulated tension, subjected to a regulated stretching and flattening pressure and then allowed to drop loosely folded into a container.

2. A method of making bias fabric which comprises the step of pulling sheet material out of a container and through a series of treatment-zones or positions, during which the material is formed into approximately tubular form, fastened at its adjacent edges to form a tube, subjected along the finished seam to regulated tension, subjected to a regulated stretching and flattening pressure and then allowed to drop loosely folded into a container, the line of pull on the material being at a level approximately even with the center of the tube being formed.

3. A method of making bias fabric which comprises the step of pulling sheet material out of a container and through a series of treatment-zones or positions, during which the material is shaped gradually and in regulated steps into a tube of the desired size, fastened at its adjacent edges to form a tube, subjected along the finished seam to regulated tension, subjected to a regulated stretching and flattening pressure and then allowed to drop loosely folded into a container.

4. A method of making bias fabric which comprises the step of pulling sheet material out of a container and through a series of treatment-zones or positions, during which the material is shaped gradually and in regulated steps into a tube of the desired size, fastened at its adjacent edges to form a tube, subjected along the finished seam to regulated tension, subjected to a regulated stretching and flattening pressure and then allowed to drop loosely folded into a container, the line of pull on the material being at a level approximately even with the center of the tube being formed.

5. A method of making bias fabric which comprises the step of pulling sheet material out of a container and through a series of treatment-zones or positions, during which the material is formed into approximately tubular form, fastened at its adjacent edges to form a tube, subjected along the finished seam to regulated tension, and subjected to regulated stretching and flattening pressure and then allowed to drop loosely folded into a container, the pulling pressure on the formed flattened tube being exerted substantially entirely in a vertical plane passing through the finished seam.

6. A method of making bias fabric which comprises the step of pulling sheet material out of a container and through a series of treatment-zones or positions, during which the material is formed into approximately tubular form, fastened at its adjacent edges to form a tube, subjected along the finished seam to regulated tension, and subjected to regulated stretching and flattening pressure and then allowed to drop loosely folded into a container, the pulling pressure on the formed flattened tube being exerted substantially entirely in a vertical plane passing through the finished seam, the line of pull on the material being at a level approximately even with the center of the tube being formed.

7. A method of making bias fabric which comprises the step of pulling sheet material out of a container and through a series of treatment zones or positions, during which the material is shaped gradually and in regulated steps into a tube of the desired size, fastened at its adjacent edges to form a tube, subjected along the finished seam to regulated tension, and subjected to regulated stretching and flattening pressure and then allowed to drop loosely folded into a container, the pulling pressure on the formed flattened tube being exerted substantially entirely in a vertical plane passing through the finished seam.

8. A method of making bias fabric which comprises the step of pulling sheet material out of a container and through a series of treatment-zones or positions, during which the material is shaped gradually and in regulated steps into a tube of the desired size, fastened at its adjacent edges to form a tube, subjected along the finished seam to regulated tension, and subjected to regulated stretching and flattening pressure and then allowed to drop loosely folded into a container, the pulling pressure on the formed flattened tube being exerted substantially entirely in a vertical plane passing through the finished seam, the line of pull on the material being at a level approximately even with the center of the tube being formed.

PERCY GARDNER.